(12) United States Patent
Fujishige et al.

(10) Patent No.: US 7,386,486 B2
(45) Date of Patent: Jun. 10, 2008

(54) SYSTEMS AND COMPUTER READABLE RECORDING MEDIUM FOR OBTAINING SOFTWARE VIA A NETWORK FOR A MULTIFUNCTION IMAGE FORMING APPARATUS

(75) Inventors: Takezo Fujishige, Kanagawa (JP); Yoshihiko Abe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 118 days.

(21) Appl. No.: 10/900,096

(22) Filed: Jul. 28, 2004

(65) Prior Publication Data
US 2005/0027615 A1 Feb. 3, 2005

(30) Foreign Application Priority Data
Jul. 30, 2003 (JP) ............................. 2003-203642

(51) Int. Cl.
G06Q 30/00 (2006.01)
G06F 17/30 (2006.01)
(52) U.S. Cl. ................................ 705/26; 705/1; 705/27
(58) Field of Classification Search ............. 705/26–27, 705/1
See application file for complete search history.

(56) References Cited

U.S. PATENT DOCUMENTS

| | | | | |
|---|---|---|---|---|
| 5,504,590 | A * | 4/1996 | Kawada et al. | 358/403 |
| 5,647,056 | A * | 7/1997 | Barrett et al. | 709/220 |
| H1743 | H * | 8/1998 | Graves et al. | 700/236 |
| 5,915,023 | A * | 6/1999 | Bernstein | 705/75 |
| 5,918,213 | A * | 6/1999 | Bernard et al. | 705/26 |
| 6,023,593 | A * | 2/2000 | Tomidokoro | 399/8 |
| 2003/0030664 | A1* | 2/2003 | Parry | 345/744 |
| 2004/0148229 | A1* | 7/2004 | Maxwell | 705/26 |
| 2005/0146745 | A1* | 7/2005 | Umehara | 358/1.15 |

(Continued)

FOREIGN PATENT DOCUMENTS

JP 2000187419 * 7/2000

(Continued)

OTHER PUBLICATIONS

Calkins, Bill. "Biometric Solutions". American Fruit Grwoer. Sep./Oct. 2002. vol. 122, Iss. 9. [receovered from Proquest database Jun. 19, 2006].*

(Continued)

*Primary Examiner*—Yogesh C. Garg
*Assistant Examiner*—William J. Allen
(74) *Attorney, Agent, or Firm*—Oblon, Spivak, McClelland, Maier & Neustadt, P.C.

(57) ABSTRACT

A multifunction image forming apparatus accepts voice input of a software name by an order applicant, carries out voice recognizing processing concerning the voice data of the software name that is voice input, and stores the software name recognized by the voice recognizing processing. Then, the multifunction image forming apparatus checks whether the order applicant is a person who has the authority to order the software. In a case where it is determined that the order applicant is a person who has the authority to order, order data including the recognized software name is sent to a software management server via a network. The multifunction image forming apparatus receives data of the software from the software management server, temporarily stores it, and thereafter, reads the data of the stored software, and carries out installing of the software.

19 Claims, 7 Drawing Sheets

U.S. PATENT DOCUMENTS

2005/0179956 A1* 8/2005 Silverbrooks et al. ...... 358/3.28

FOREIGN PATENT DOCUMENTS

| JP | O20010245071 A | * | 9/2001 |
| JP | 2002-209051 | | 7/2002 |
| JP | 2004118365 A | * | 4/2004 |

OTHER PUBLICATIONS

Vijayan, Jaikumar. "IBM extends uasge-based pricing to S/390". Computerworld. Jun. 1, 1998. vol. 32, Iss. 22. [receovered from Proquest database Jun. 19, 2006].*

* cited by examiner

SYSTEMS AND COMPUTER READABLE RECORDING MEDIUM FOR OBTAINING SOFTWARE VIA A NETWORK FOR A MULTIFUNCTION IMAGE FORMING APPARATUS

BACKGROUND OF THE INVENTION

1. Field of the Invention

The present invention relates to a system for obtaining a software via a network, etc.

2. Description of the Related Art

Conventionally, in a case where users of a multifunction copying machine that has a function of a scanner, printer, or a facsimile, etc., installs a driver software such as a scanner driver and a printer driver, etc., to the multifunction copying machine, the users purchase a CD-ROM, etc. that has a driver software stored, each time to carry out installing.

However, the method of purchasing a CD-ROM that has a driver software stored, and installing it to the multifunction image forming apparatus, takes a long time from the time an order of software is carried out, until the CD-ROM arrives, therefore, even if the user wants to operate the copying machine with the software of a new version immediately, the user has to wait until the arrival of the software.

In Unexamined Japanese Patent Application KOKAI Publication No. 2002-209051, an image forming apparatus, etc., which downloads a driver via a network, is disclosed.

However, because anyone can carry out an order operation in the system for obtaining a driver via a network, there is a problem in safety. Also, there is a problem that if a software is obtained via a network, it is difficult to manage which software is obtained.

Realization of a system wherein only the person who has the authority to obtain a software can order software via a network, and obtain the software, is desired. Also, realization of a system that can manage information concerning the installed software, is desired.

SUMMARY OF THE INVENTION

The present invention has been made in consideration of the above, and an object of the present invention is to provide a highly safe software obtaining system, etc., that can rapidly obtain software of a requested driver, etc., and only the person who has legitimate authority can order software.

Another object of the present invention is to provide a software obtaining system, etc., that can manage information concerning the obtained software.

A software obtaining system according to a first aspect of the present invention, is for obtaining software via a network, that comprises a multifunction image forming apparatus that includes at least one function of a copying machine, a printer, and a facsimile, and a software management server which is connected to the multifunction image forming apparatus via a network, receives a request from the multifunction image forming apparatus, and sends software to the multifunction image forming apparatus, wherein the multifunction image forming apparatus comprises:

an input operation unit wherein a software is designated;

a physical information storing unit which stores physical information of a person who has the authority to order;

a physical information reading unit which reads the physical information of an order applicant;

an authentication control unit which matches the physical information of the order applicant read by the physical information reading unit, against the physical information of the person who has the authority to order, stored in the physical information storing unit, and checks whether the order applicant is a person who has the authority to order;

a sending unit which sends order data including the name of the software, via the network, in a case where it is determined by the authentication control unit that the order applicant is a person who has the authority to order; and a storing unit which receives data of the software that the order data indicates, via the network, and stores the received data.

A computer readable recording medium according to a second aspect of the present invention, stores a program for controlling a computer to execute:

a step of designating a software to be obtained;

a step of storing physical information of a person who has the authority to order, in advance;

a step of reading the physical information of an order applicant;

a step of matching the read physical information of the order applicant against the physical information of the person who has the authority order, which is stored in advance, and checking whether the order applicant is a person who has the authority to order;

a step of sending order data including the name of the software, via the network, in a case where it is determined that the order applicant is a person who has the authority to order, by the step of checking whether the order applicant is a person who has the authority to order; and a step of receiving data of the software that the order data indicates, via the network, and storing the data.

A computer data signal according to a third aspect of the present invention is a computer data signal embedded in a carrier wave, representing a program for controlling a computer to execute:

a step of designating a software to be obtained;

a step of storing physical information of a person who has the authority to order, in advance;

a step of reading the physical information of an order applicant;

a step of matching the read physical information of the order applicant against the physical information of the person who has the authority to order, which is stored in advance, and checking whether the order applicant is a person who has the authority to order;

a step of sending order data including the name of the software, via the network, in a case where it is determined that the order applicant is a person who has the authority to order, by the step of checking whether the order applicant is a person who has the authority to order; and a step of receiving data of the software that the order data indicates, via the network, and storing the data.

BRIEF DESCRIPTION OF THE DRAWINGS

These objects, and other objects and advantages of the present invention will become more apparent upon reading of the following detailed description and the accompanying drawings in which.

DETAILED DESCRIPTION OF THE PREFERRED EMBODIMENT

A software obtaining system according to an embodiment of the present invention will be described with reference to the drawings.

Figure 1:
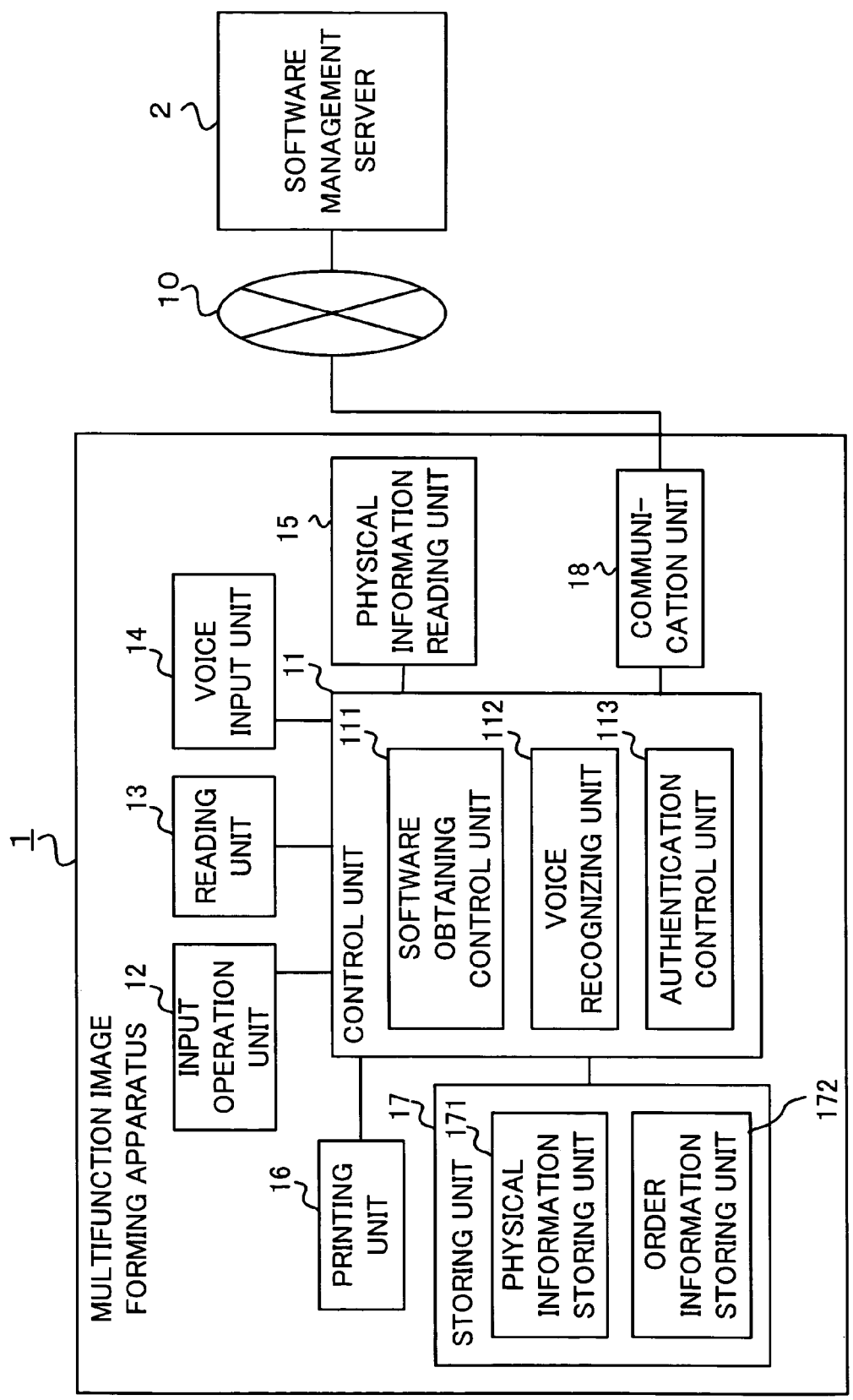
FIG. 1 is a diagram showing an example of a structure of a software obtaining system according to an embodiment of the present invention.

FIG. 1 shows an example of a structure of a software obtaining system using the multifunction image forming apparatus according to the embodiment of the present invention. As shown in FIG. 1, a multifunction image forming apparatus 1 is placed at for example, business units of companies, etc., and is connected to a software management server 2 of a software supplying agency.

Figure 2:
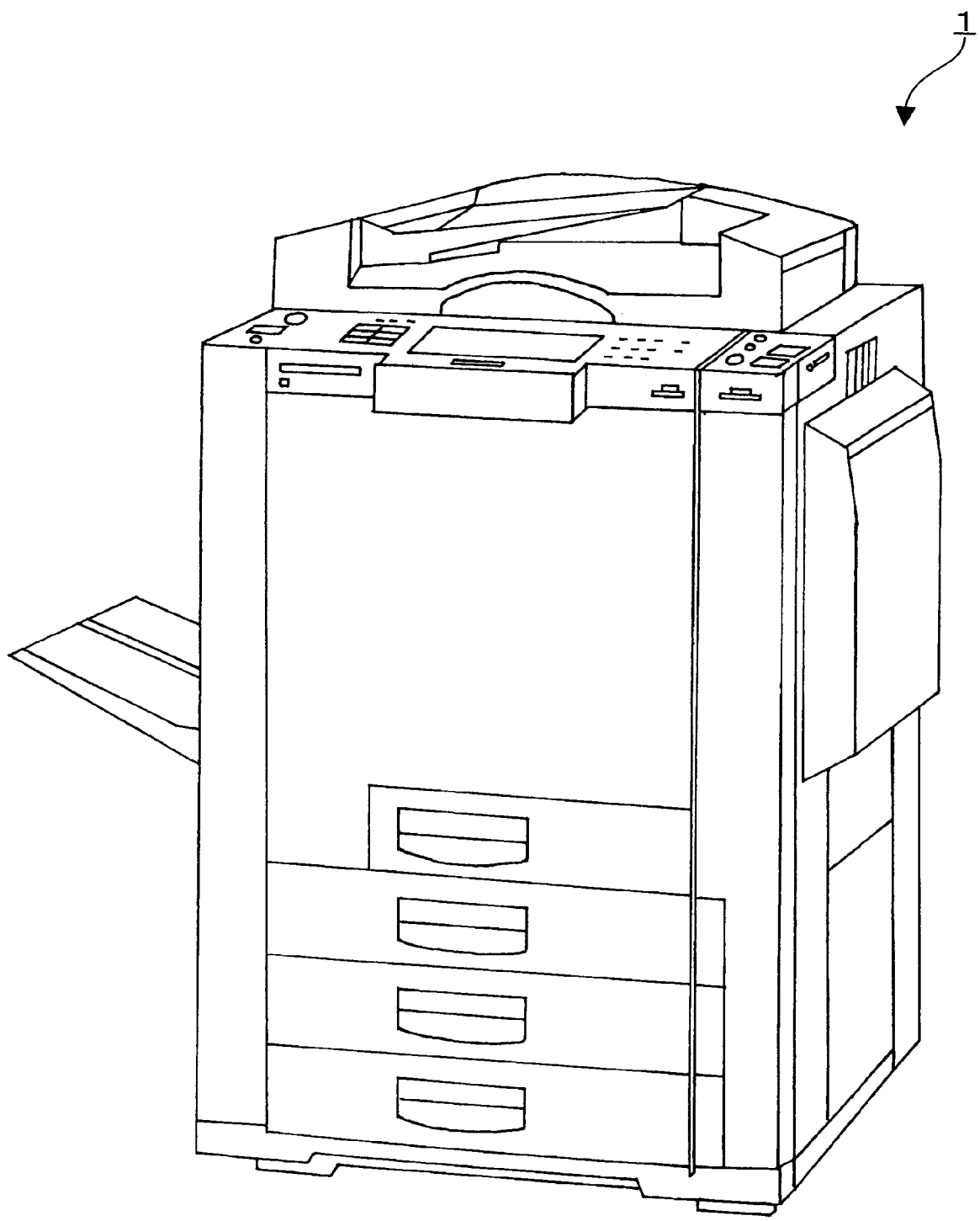
FIG. 2 is a diagram showing an exterior view of a multifunction image forming apparatus according to the embodiment of the present invention.

An example of an exterior view of the multifunction image forming apparatus 1 is shown in FIG. 2. The multifunction image forming apparatus 1 is an apparatus that comprises a plurality of image forming functions, such as for example, a copying machine, a printer, and a facsimile, etc. The multifunction image forming apparatus 1 comprises a control unit 11, an input operation unit 12, a reading unit 13, a voice input unit 14, a physical information reading unit 15, a printing unit 16, a storing unit 17, and a communication unit 18.

The control unit 11 is constituted by a CPU (Central Processing Unit), a ROM (Read Only Memory), and a RAM (Random Access Memory), etc. By reading and executing an operation program, etc. that is stored in the storing unit 17 in advance, the control unit 11 controls the entirety of the multifunction image forming apparatus 1. Also, by reading and executing the operation program, etc. that is stored in the storing unit 17 in advance, the control unit 11 logically realizes a software obtaining control unit 111, a voice recognizing unit 112, and an authentication control unit 113, etc.

The software obtaining control unit 111 has a Web browser function. The software obtaining control unit 111 connects to the management server 2 of the software supplying agency via the network 10 in response to a predetermined input operation by an order applicant, and receives for example, screen information (web page) of a list of software, supplied by the software management server 2.

The software obtaining control unit 111 displays the received screen information, etc., of the list of software, on a display unit of the input operation unit 12. The software obtaining control unit 111 accepts input via the voice input unit 14 or the input operation unit 12 by the order applicant. In a case where a software name is input to the voice input 14, by the order applicant, the software obtaining control unit 111 controls the voice recognizing unit 112, and by voice recognizing processing, specifies the name of the software which is the order target, that is carried out voice input. The software obtaining control unit 111 generates order acceptance information that includes the order target software name that is designated via the voice input unit 14 or the input operation unit 12, and data of acceptance time, etc., and registers the information to an order information storing unit 172 of the storing unit 17.

The software obtaining control unit 111 controls the authentication control unit 113 to carry out authentication of whether the order applicant is a person that has authority to order, by using the physical information of the order applicant, such as fingerprints, irises, voice patterns, and vein patterns, etc. In a case where the authentication control unit 113 determines that the order applicant is not a person who has the authority to order the software, the authentication control unit 113 sends a denial signal as an authentication result, to the software obtaining control unit 111. In a case where the software obtaining control unit 111 receives the denial signal, the software obtaining control unit 111 carries out a predetermined warning processing.

On the other hand, in a case where the authentication control unit 113 determines that the order applicant is a person who has the authority to order the software, the authentication control unit 113 sends an enabling signal to the software obtaining control unit 111. In a case where the software obtaining control unit 111 receives the enabling signal, the software obtaining control unit 111 determines whether the software that is designated as an order, is stored as installed software, in the order information storing unit 172 of the storing unit 17.

In a case where the designated software is not stored, the software obtaining control unit 111 generates order data of a predetermined format that includes a software name that is an order target, order source information (company name, company code, etc.), and address, etc., of the multifunction image forming apparatus 1, and sends the order data together with an order request to the software management server 2. In a case where the designated software is stored, the software obtaining control unit 111 displays for example, information indicating that the designated software is already installed, and information confirming whether an order is to be carried out, on the display unit of the input operation unit 12.

The software obtaining control unit 111 receives program data, etc., of the software sent from the software management server 2, in accordance with the order request, and temporarily stores the program data, etc., to the storing unit 17. Also, after reading the program data, etc., of the software temporarily stored in the storing unit 17, and carrying out installing, the software obtaining control unit 111 stores information, such as the name, etc., of the software that is carried out installing, to the order information storing unit 172 of the storing unit 17.

The voice recognizing unit 112 carries out predetermined converting processing, such as sampling and quantization, etc., concerning a voice signal output from the voice input unit 14, in accordance with instructions from the software obtaining control unit 111. The voice recognizing unit 112 specifies the software name that is the order target, by comparing the converted voice data with a voice pattern that is registered in advance, and carrying out ordinary voice recognizing processing, such as obtaining character string data corresponding to the voice.

The authentication control unit 113 receives data of physical information of the order applicant, such as for example, fingerprints, etc., from the physical information reading unit 15, and carries out authentication processing of matching the physical information against the physical information of the person who has the authority to order, which is registered in the storing unit 17 in advance. Matching the read physical information, against the physical information that is stored in advance, in a case where the physical information match, the authentication control unit 113 sends an enabling signal as the authentication result, to the software obtaining control unit 111. In a case where the physical information does not match, the authentication control unit 113 sends a denial signal to the software obtaining control unit 111.

By reading various software stored in the storing unit 17, and executing the various software, the control unit 11 controls the reading unit 13, the printing unit 16, and the communication unit 18, etc., to realize each function, such as a copying machine, a printer, and a facsimile, etc.

The input operation unit 12 comprises an input unit such as an input key, etc., and a display unit such as a liquid crystal display, etc. The input operation unit 12 displays various data on the display unit, and sends the data input from the input unit to the control unit 11, in accordance with instructions from the control unit 11.

The reading unit 13 is constituted by a scanner, etc. The reading unit 13 reads images by optically scanning manuscripts, such as documents and drawings, and converts the image to image information, in accordance with instructions from the control unit 11.

The voice input unit 14 is constituted by a microphone, etc., and outputs a voice signal of an input voice to the control unit 11. The voice signal is used as input means, as well as voice matching for determining whether the order applicant is a person who has the authority to carry out an order.

In a case whether a person is authorized or not is determined by voice matching, voice data of the person who has the authority to order is stored in a physical information storing unit 171 of the storing unit 17 in advance, and in the authentication processing, the control unit 11 may receive voice input of a predetermined keyword from the order applicant, by the voice input unit 14, match the voice data obtained by carrying out a predetermined converting processing (A/D conversion, etc.) concerning the input voice against the voice data of the registered predetermined keyword, and determine that a person has the authority to order, in a case where the voice data match.

The physical information reading unit 15 is constituted by a fingerprint sensor, etc. The physical information reading unit 15 reads physical information such as fingerprints, etc., of the order applicant, in accordance with instructions from the control unit 11, generates physical information, and sends it to the control unit 11. Physical information for determining whether a person has the authority to order or not, is not limited to fingerprints, and irises and vein patterns of fingertips or palms can be used.

In a case where iris matching is adopted, the physical information reading unit 15 further comprises an iris acknowledging unit (not shown) such as a camera, etc. The authentication control unit 113 matches image information (iris data) of an iris obtained by imaging, etc. the iris of the order applicant by a camera, against image information of the iris of the person who has the authority to order, which is stored in the physical information storing unit 171 in advance. In a case where the image information match, the authentication control unit 113 determines that the person has the authority to order.

In a case where vein patterns are used, the physical information reading unit 15 further comprises a vein pattern reading unit which reads vein patterns by emitting infrared rays, etc. to the fingertip or the palm.

The printing unit 16 prints image information, etc., read by the reading unit 13, in accordance with instructions from the control unit 11, on a sheet.

The storing unit 17 is constituted by a hard disk, and a DVD-RAM, etc., and stores operation programs that the control unit 11 executes, various software obtained by the software obtaining control unit 111, and various data, etc., necessary for processing.

The storing unit 17 comprises a physical information storing unit 171 which stores physical information of the person who has the authority to order software. Physical information stored in the physical information storing unit 171 is for example, information such as, fingerprints, irises, voice patterns, and vein patterns, etc. The storing unit 17 also comprises an order information storing unit 172 which stores order information of the multifunction image forming apparatus 1. For example, order information includes, order acceptance information, various information concerning the installed software (software list, number of software, price and utility fee, utility situation, utility record, and updating record, etc. of each software), and order source information (company name, company code) etc., included in the order data sent to the software management server 2.

The communication unit 18 is constituted by a network 10, such as the Internet, and a communication device, etc., which is connected to a public line network, etc.

Figure 3:
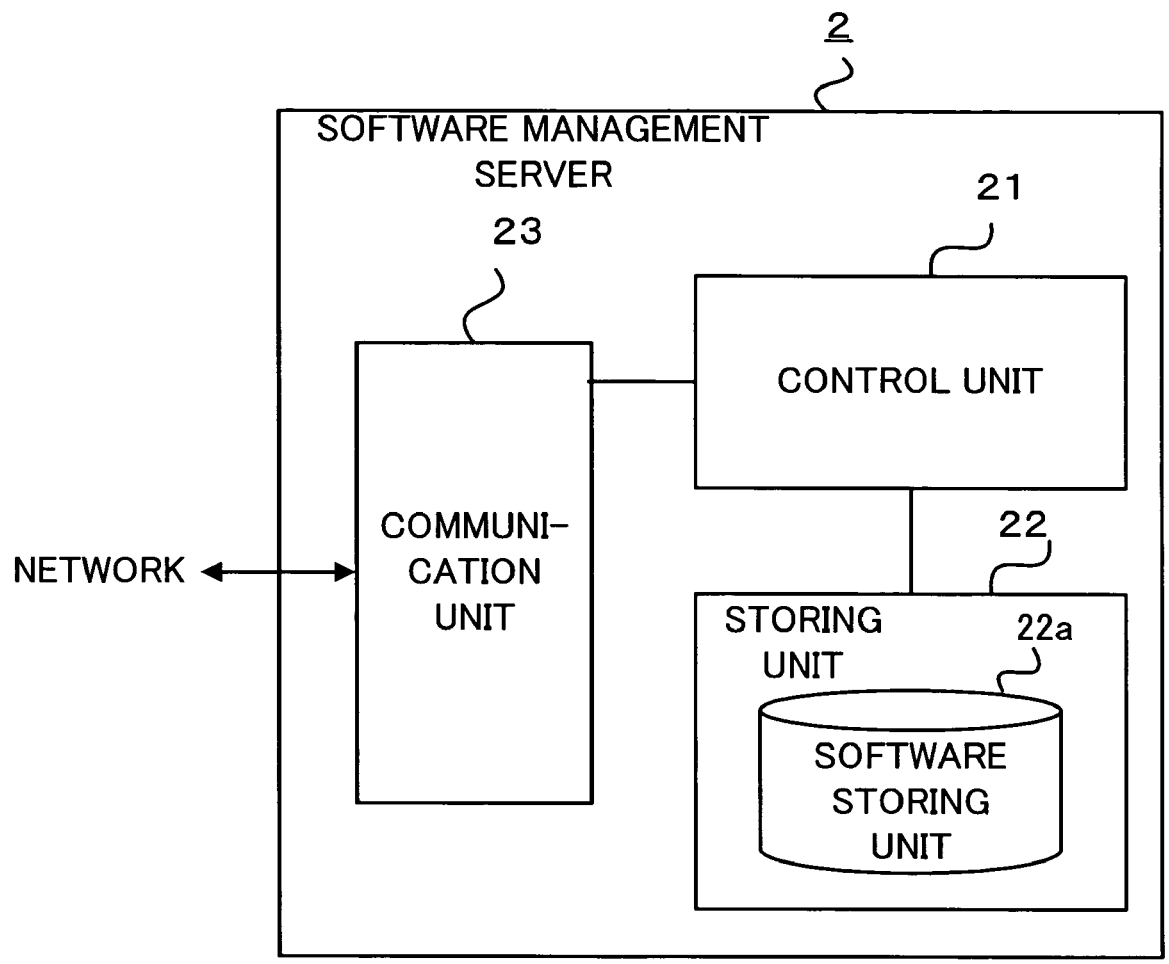
FIG. 3 is a diagram showing an example of a structure of a software management server according to the embodiment of the present invention.

For example, as shown in FIG. 3, the software management server 2 is constituted by a computer that comprises a control unit 21, a storing unit 22, and a communication unit 23, etc.

By executing operation programs, etc., stored in the storing unit 22, the control unit 21 accepts order of software, via the network 10, and carries out processing for providing the software to the order source. Concretely, the control unit 21 sends image information that displays a list of software, etc., in accordance with access from the multifunctional image forming apparatus 1.

When receiving an order request and order data from the multifunction image forming apparatus 1 via the network 10, the control unit 21 stores the order data to the storing unit 22, reads program data, etc. of software that the received order data indicates from a software storing unit 22a of the storing unit 22, and sends the program data, etc. to the request source via the network 10.

The storing unit 22 comprises a software storing unit 22a that stores program data, etc., of various software (including installer of software and various data necessary for executing the software). Also, the storing unit 22 stores operation programs that the control unit 21 executes, and various data necessary for processing.

The communication unit 23 controls data communication with the multifunction image forming apparatus 1, etc.

Next, software obtaining processing by the multifunction image forming apparatus 1 according to the embodiment of the present invention, will be described with reference to the flowchart in FIG. 4. Here, a case where a software having the name of "RP 100" is obtained, will be described as an example.

First, the control unit 11 of the multifunction image forming apparatus 1 connects to the software management server 2 via the network 10, in accordance with a predetermined input operation for ordering software, such as for example, holding down, etc., a predetermined key.

The control unit 11 receives display screen information such as list of software, etc., displays it on the input operation unit 12, and accepts input of the name of software that is the order target (step S1). At this time, the control unit 11 displays on a display screen of the input operation unit 12, a message for urging input via the input unit of the input operation unit 12, and a message urging vocalization of the software name. A voice message urging vocalization of the software name may be output by a speaker (not shown).

In a case where the order applicant vocalizes "RP 100" and input of the software name is carried out by voice input, the control unit 11 carries out a predetermined conversion processing and voice recognition processing concerning the input voice, so as to specify the software name "RP 100".

When the software name input via voice input or the input operation unit 12 is specified (step S2), the control unit 11 determines whether the designated software name "RP 100" is included in the installed software information stored in the order information storing unit 172 of the storing unit 17, and has already been obtained or not (step S3).

In a case where the "RP 100" has not been obtained, i.e., in a case where "RP 100" is not included in the installed software information (step S3: NO), the control unit 11 generates order acceptance information, which includes the software name "RP 100" and acceptance time, etc., and registers it to the order information storing unit 172 (step S4).

In a case where "RP 100" has already been obtained, i.e., in a case where "RP 100" is included in the installed software information (step S3: YES), the control unit 11 displays on the display unit of the input operation unit 12, information indicating that the ordered software has already been obtained, and whether the software should be re-obtained, so as to confirm to the order applicant, whether the order should be carried out or not (step S11).

When instructions for obtainment is carried out by the order applicant (step S12: YES), the control unit 11 generates order acceptance information, which includes software name and acceptance time, etc., and registers it to the order information storing unit 172 (step S4).

In a case where the order applicant does not carry out instructions for obtainment, (step S12: NO), the control unit 11 ends the software obtaining processing.

Next, the control unit 11 reads the physical information of the order applicant via the voice input unit 14 or the physical information reading unit 15 (step S5).

The control unit 11 matches the physical information of the order applicant, such as for example, fingerprint information or voice pattern information, etc., obtained in step S5, against physical information of the person who has the authority to order, that is stored in the physical information storing unit 171 in advance, and determines whether the order applicant is a person who has the authority to order (step S6).

In a case where it is determined that the order applicant is not a person who has the authority to order, (step S6: NO), namely, in a case where the physical information of the person who has the authority to order and the physical information of the order applicant do not match, the control unit 11 carries out a predetermined warning processing for issuing an alert to the administrator (step S13).

As concrete content of warning processing, there are for example, displaying a message indicating that an order operation is carried out by a person other than the person who has the authority to order, on a liquid crystal display of the input operation unit 12, emitting a warning sound from a not-shown speaker, and sending e-mail of a content that notifies that there was an unauthorized order to the address of the administrator, which is registered in advance, etc.

In a case where it is determined that the order applicant is a person who has the authority to order (step S6: YES), the control unit 11 generates order data of a predetermined format, which includes software name of the order target, order source information (company name, company code, etc.), and data of address, etc., of the multifunction image forming apparatus 1, and sends the data together with an order request to the software management server 2 (step S7).

In accordance with receiving the order request and order data, the software management server 2 stores the received order data, reads the program data, etc., of the software "RP 100" that the order indicates from the software storing unit 22a, and sends it to the multifunction image forming apparatus 1 which is the request source.

The control unit 11 of the multifunction image forming apparatus 1 receives program data of the software "RP 100" from the software management server 2 and temporarily stores it to the storing unit 17 (step S8).

Then, the control unit 11 reads the program data, etc., of the software that is temporarily stored in the storing unit 17, and carries out installing of the software "RP 100" by starting a program for embedding, etc. (step S9). Concretely, for example, in a case where the program data, etc., of software is a compressed file, the file is uncompressed by starting a decompression program, and by executing the program for embedding (installer) of the file that is uncompressed, the ordered software is stored in a predetermined region of the storing unit 17, and various setting, etc., necessary for executing the software is carried out. By this, installing of the software "RP 100" is completed.

The software obtaining control unit 111 stores information of the installed software, such as software name, etc., as installed software information to the order information storing unit 172 (step S10), and ends the software obtaining processing.

Figure 4:
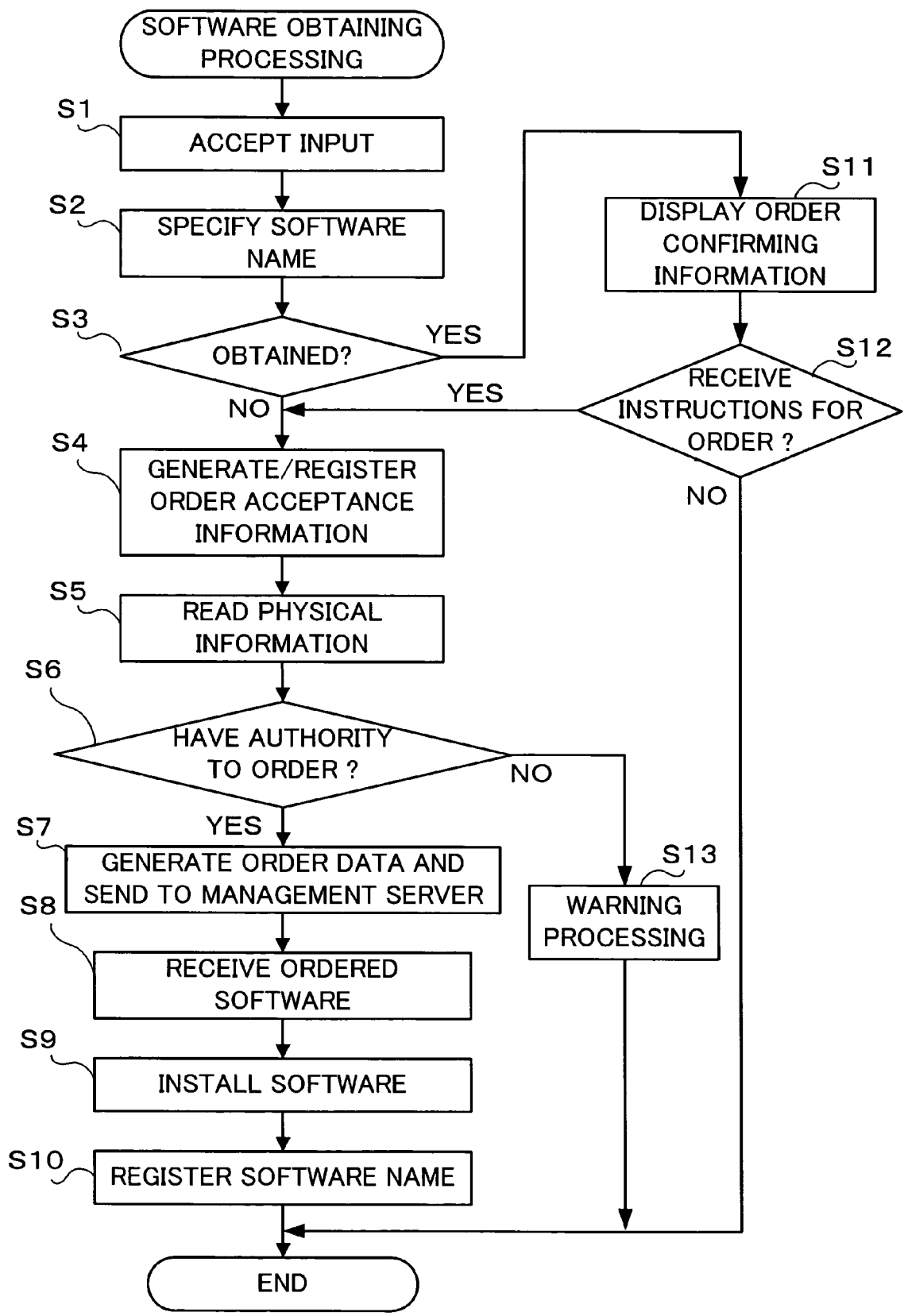
FIG. 4 is a flowchart of software obtaining processing.

In step S6 of the flowchart in FIG. 4, a method of using physical information such as fingerprints, etc., when the control unit 11 authenticates whether a person has the authority to order or not, is described. However, the method for authenticating whether a person has the authority to order or not, is not limited to this method. For example, a method of authenticating whether the order applicant is a person who has the authority to order or not, by for example, the control unit 11 accepting input of a code or a password, etc., from the input operation unit 12, and matching it against a code or a password that is stored in the storing unit 17 in advance, can be adopted. This method can be used instead of the method of authenticating by using physical information, or can be used together with the method thereof.

As described above, according to the present invention, because the multifunction image forming apparatus 1 carries out processing for ordering software via the network 10, in accordance with input operation by the order applicant, a requested software can be rapidly obtained. Also, by carrying out authentication based on the physical information of the user, only the person who has the authority to order can purchase software, therefore safety can be enforced.

Further, by storing the name of the installed software and information of the obtained date and time to the storing unit 17, and including an operation of determining whether a same software name is registered in the storing unit 17 or not, a case where the same software is ordered twice does not occur when newly ordering a software, therefore, management of the ordered software becomes possible.

Figure 5:
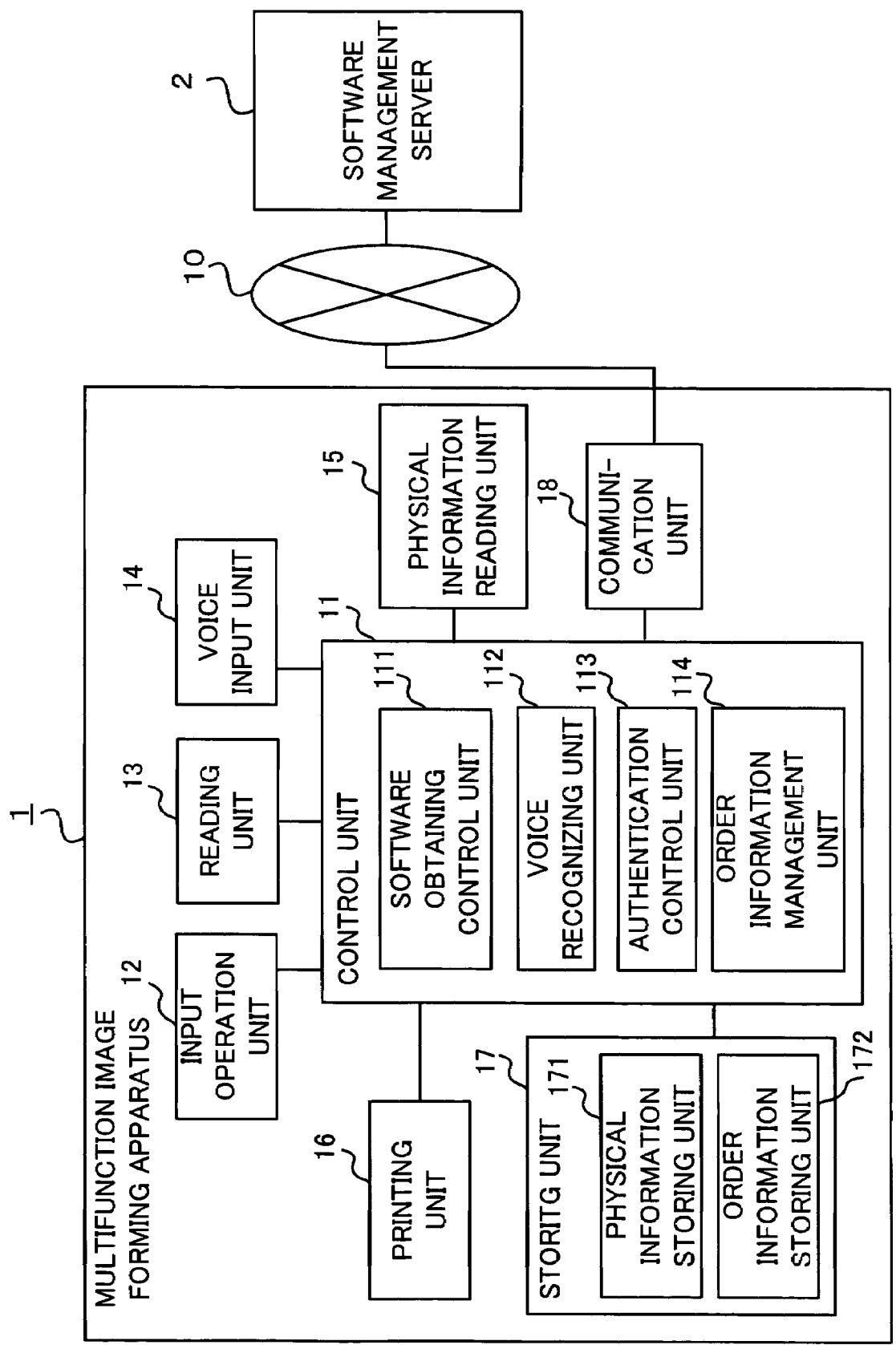
FIG. 5 is a diagram showing an example of a structure of the multifunction image forming apparatus that comprises an order information management unit.

In addition to the above embodiment, a structure where, as shown in FIG. 5, the control unit 11 comprises an order information management unit 114 that generates discount information for requesting a discount of software to the software management server 2, and sends information requesting discount of software, at the same time as ordering a software to the management server 2, so as to receive discount of software, can be adopted.

In this case, the order information management unit 114 creates discount information using information concerning the ordered software such as the number of software and price, stored in the order information storing unit 172 of the storing unit 17, based on a calculating formula or a table that is stored in the storing unit 17 in advance. Concretely, the order information management unit 114 totals the number of installments (or accumulates the price, utility fee of the installed software) each time installing processing of software is carried out, and stores the information as utility performance information. In a case where this utility performance information meets a predetermined condition, the order information management unit 114 obtains a discount amount or discount rate referring to a calculating formula that is registered in advance, or a table that has a total amount and a discount amount correlated, and creates discount information.

After the discount information is created, the order information management unit 114 may clear the information concerning the software in the order information storing unit 172 and add information each time there is a new order, or the order information management unit 114 may not clear the information, and keep on accumulating.

A structure where the order information management unit 114 does not obtain a discount rate by the calculation formula or table stored in the storing unit 17 as discount information, but only the order information of software is attached to the order request, and the server 2 carries out the calculation of the discount rate, can be adopted.

In accordance with the discount request, after the software management server 2 carries out a predetermined check (for example, checking whether the discount request is allowable or not, by referring to the order record of the request source, etc.) the software management server 2 carries out a discount of a predetermined amount from the amount charged to the company that has the multifunction image forming apparatus 1 of the discount source.

A structure where a screen that includes service content such as discount rate, etc., is also displayed when the list of software is displayed, and provided to the user, and the user selects a software from there, can be adopted besides a structure where a discount is carried out after ordering. In this case, The software management server 2 comprises a region for storing the order record of the software.

For example, the software management server 2 may supply screen information that displays predetermined multiple kinds of software names and information, etc., indicating the rate of discount if a few kinds of software is used, on the multifunction image forming apparatus 1, and the multifunction image forming apparatus 1 may display the screen information.

The screen structure may be that when a key corresponding to a number of kinds of software is pressed down, the discount rate corresponding to that number of kinds of software is displayed, instead of a screen structure where information indicating the rate of discount if a few kinds of software is used, is displayed at one time.

Figure 6:
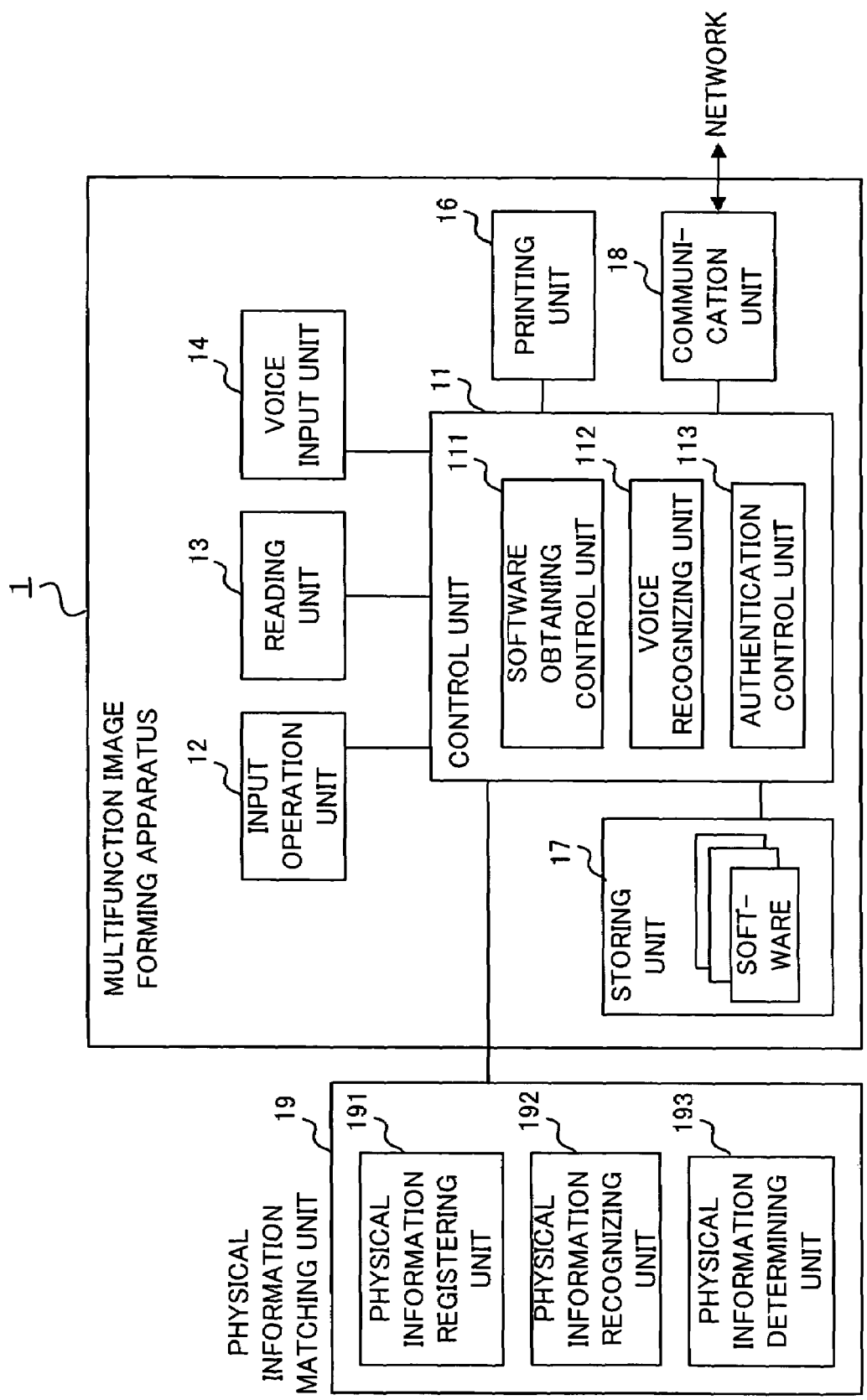
FIG. 6 is a diagram showing an example of a structure of the multifunction image forming apparatus that comprises a physical information matching unit.

In the above embodiment, a structure where the physical information of the order applicant is authenticated by the authentication control unit 113 in the physical information reading unit 15 and the control unit 11 is adopted. However, it is not limited to this, and for example, as shown in FIG. 6, the physical information of the order applicant may be authenticated by a physical information matching unit 19 that is separated from the multifunction image forming apparatus 1. The physical information matching unit 19 (physical information matching device) is connected by the multifunction image forming apparatus 1 and a wireless LAN, or by a fixed line, carries out matching of physical information of the order applicant, and sends the matched result to the multifunction image forming apparatus 1. The physical information matching unit 19 (physical information matching device) comprises a physical information registering unit 191 where physical information of the people who are authorized to order is registered, a physical information recognizing unit 192 that carries out reading of the physical information, and a physical information determining unit 193 that matches the physical information obtained by the physical information recognizing unit 192 against the physical information registered in the physical information registering unit 191, determines whether the two match, and sends the determined result to the control unit 11 of the multifunction image forming apparatus 1.

Figure 7:
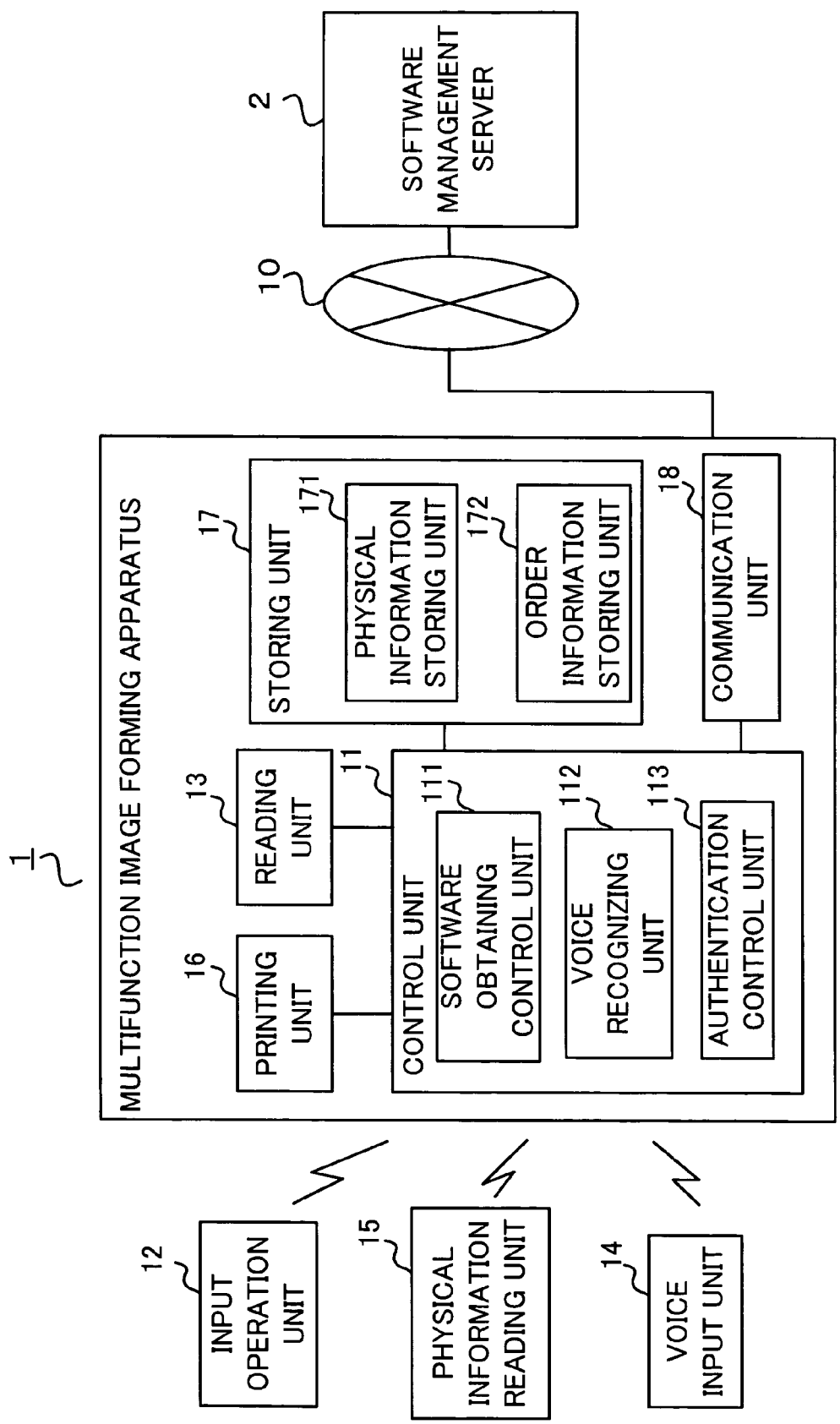
FIG. 7 is a diagram showing an example of a structure of the multifunction image forming apparatus wherein each of, an input operation unit, a voice input unit, and a physical information reading unit is connected via a wireless LAN.

Moreover, the structure is not limited to the structure shown in FIG. 7, and the input operation unit 12 may comprise at least either the voice input unit 14 or the physical information reading unit 15. Or, an operation unit that comprises either the voice input unit 14 or the physical information reading unit 15 (or the above physical information matching unit 19) may be connected to the multifunction image forming apparatus 1 by a wireless LAN, and may be provided so that it can be attached and removed freely.

In the above embodiment, a structure where the information concerning the obtained software is stored in the order information storing unit 172 after installment is adopted. However, it is not limited to this, and a structure where the information concerning the obtained software is stored in the order information storing unit 172 at the time the software is received from the software management server 2, can be adopted.

A program for executing the operation of the above embodiment may be stored in a computer readable recording medium (FD, CD-ROM, DVD, etc.) and distributed, and the program may be installed to the multifunction image forming apparatus 1. Or, the program for executing the operation of the above embodiment may be stored in a disk device that a server device in a network comprises, such as the Internet, etc., and may be downloaded, etc., to the multifunction image forming apparatus 1, by for example, embedding the program on a carrier wave.

In a case where a part of each of the above functions is realized by an OS, or each of the above functions is realized together with an application, parts other than the OS may be stored in a medium and distributed, or the program may be embedded in a carrier wave, and downloaded, etc., to a computer.

According to the present invention, with the software obtaining system, it is possible to obtain a requested software rapidly, and only the person who has the authority to order can purchase software.

Further, information concerning the software obtained in a multifunction image forming apparatus can be managed.

Various embodiments and changes may be made thereunto without departing from the broad spirit and scope of the invention. The above described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-203642 filed on Jul. 30, 2003, and including specification, claims, drawings, and summary. The disclosure of the above Japanese Patent Application is incorporated herein by reference in its entirety.

What is claimed is:

1. A software obtaining system for obtaining software via a network, that comprises a multifunction image forming apparatus that includes at least one function of a copying machine, a printer, and a facsimile,
wherein the multifunction image forming apparatus comprises:
an input operation unit wherein a software is designated, the input operation unit including a display to display a list of software, and an input for accepting a user's selection of software from the list of software;
a physical information storing unit which stores physical information of a person who has the authority to order the designated software;
a physical information reading unit which reads the physical information of an order applicant;
an authentication control unit which matches the physical information of the order applicant read by the physical information reading unit, against the physical information of the person who has the authority to order the designated software, stored in the physical information storing unit, and checks whether the order applicant is a person who has the authority to order the designated software;
a sending unit which sends order data including the name of said software via said network based on the user's selection from the list of software, in a case where it is determined by the authentication control unit that said order applicant is a person who has the authority to order the designated software; and
a storing unit which receives and stores data of the software that said order data indicates, via said network,
wherein said multifunction image forming apparatus further comprises an order information storing unit which stores the information concerning the ordered software,
wherein said order information storing unit stores software discount calculating information used for requesting discount of software, and
wherein said multifunction image forming apparatus comprises an order information management unit which creates discount information for requesting discount of software, based on information concerning the installed software and said discount calculating information.

2. The software obtaining system according to claim 1, wherein said multifunction image forming apparatus comprises:
a voice input unit which accepts voice input of a software name by an order applicant, and
a voice recognizing unit which carries out voice recognizing processing concerning the voice data of the software name that is voice input, and specifies the name of the software.

3. The software obtaining system according to claim 1, wherein the physical information reading unit of the multifunction image forming apparatus reads at least one of, finger print information, iris information, and vein pattern information.

4. The software obtaining system according to claim 1, wherein the physical information stored in said physical information storing unit is at least one of, finger print information, iris information, vein pattern information, and voice pattern information.

5. The software obtaining system according to claim 1, wherein said order information management unit calculates an accumulated amount of utility fee of software based on said order information, and calculates at least either the discount rate or the discount amount of software, based on said calculated accumulated amount.

6. The software obtaining system according to claim 1, wherein said multifunction image forming apparatus further comprises a software obtaining control unit which reads data of said software from said storing unit, and carries out installing of said software.

7. The software obtaining system according to claim 6, wherein said software obtaining control unit stores the name of the software that is installed, to said order information storing unit, and determines whether the software name input by said input operation unit is stored as a software name that is installed.

8. The software obtaining system according to claim 1, wherein said image forming apparatus comprises a physical information matching unit which is connected by a wireless LAN, and said physical information matching unit comprises:
a physical information registering unit which stores the physical information of the person who has the authority to order software, in advance;
a physical information reading unit which reads physical information; and
a physical information determining unit which determines whether the physical information read in said physical information reading unit is stored in said physical information registering unit.

9. The software obtaining system according to claim 8, wherein said physical information is at least one of, finger print, voice, iris, and vein pattern.

10. The software obtaining system according to claim 1, wherein said multifunction image forming apparatus comprises an input unit which is connected by a wireless LAN, and further comprises at least either a physical information reading unit which reads physical information of the order applicant or a voice input unit, each of the physical information reading unit and the voice input unit being connected to the multifunction image forming apparatus by wireless LAN.

11. A software obtaining system for obtaining software via a network, that comprises
a multifunction image forming apparatus that includes at least one function of a copying machine, a printer, and a facsimile, and
a software management server which is connected to said multifunction image forming apparatus via a network, receives a request from said multifunction image forming apparatus, and sends software to the multifunction image forming apparatus,
wherein said multifunction image forming apparatus comprises:
an input operation unit wherein a software is designated, the input operation unit, including a display to display a list of software, and an input for accepting a user's selection of software from the list of software;
a physical information storing unit which stores physical information of a person who has the authority to order the designated software;
a physical information reading unit which reads the physical information of an order applicant;
an authentication control unit which matches the physical information of the order applicant read by the physical information reading unit, against the physical information of the person who has the authority to order the designated software, stored in the physical information storing unit, and checks whether the order applicant is a person who has the authority to order the designated software;

a sending unit which sends order data including the name of said software, to said management server via said network, based on the user's selection from the list of software, in a case where it is determined by the authentication control unit that said order applicant is a person who has the authority to order the designated software; and a storing unit which receives data of the software that said order data indicates from said software management server, via said network, and stores the received data, wherein said multifunction image forming apparatus further comprises an order information storing unit which stores the information concerning the ordered software, wherein said order information storing unit stores software discount calculating information used for requesting discount of software, and wherein said multifunction image forming apparatus comprises an order information management unit which creates discount information for requesting discount of software, based on information concerning the installed software and said discount calculating information.

12. A computer readable recording medium which stores a program for controlling a computer to execute:

a step of designating a software to be obtained, including displaying a list of software, and accepting a user's selection of software from the list of software;

a step of storing physical information of a person who has the authority to order the designated software, in advance;

a step of reading the physical information of an order applicant;

a step of matching the read physical information of the order applicant against the physical information of the person who has the authority to order the designated software, which is stored in advance, and checking whether the order applicant is a person who has the authority to order the designated software;

a step of sending order data including the name of said software, via said network, based on the user's selection from the list of software, in a case where it is determined that said order applicant is a person who has the authority to order the designated software, by said step of checking whether the order applicant is a person who has the authority to order the designated software, and a step of receiving data of the software that said order data indicates, via said network, and storing the data, a step of storing, in an order information storing unit, the information concerning the ordered software, a step of storing, in said order information storing unit, software discount calculating information used for requesting discount of software, and a step of creating discount information for requesting discount of software, based on information concerning the installed software and said discount calculating information.

13. A software obtaining system for obtaining software via a network, that comprises a multifunction image forming apparatus that includes at least one function of a copying machine, a printer, and a facsimile, wherein the multifunction image forming apparatus comprises:

an input operation unit wherein a software is designated;

a physical information storing unit which stores physical information of a person who has the authority to order the designated software;

a physical information reading unit which reads the physical information of an order applicant;

an authentication control unit which matches the physical information of the order applicant read by the physical information reading unit, against the physical information of the person who has the authority to order the designated software, stored in the physical information storing unit, and checks whether the order applicant is a person who has the authority to order the designated software;

a sending unit which sends order data including the name of said software via said network, in a case where it is determined by the authentication control unit that said order applicant is a person who has the authority to order the designated software; and a storing unit which receives and stores data of the software that said order data indicates, via said network; and an order information storing unit which stores the information concerning the ordered software, wherein said order information storing unit stores software discount calculating information used for requesting discount of software, and wherein said multifunction image forming apparatus comprises an order information management unit which creates discount information for requesting discount of software, based on information concerning the installed software and said discount calculating information.

14. The software obtaining system according to claim 13, wherein said multifunction image forming apparatus comprises:

a voice input unit which accepts voice input of a software name by an order applicant, and a voice recognizing unit which carries out voice recognizing processing concerning the voice data of the software name that is voice input, and specifies the name of the software.

15. The software obtaining system according to claim 13, wherein the physical information reading unit of the multifunction image forming apparatus reads at least one of, finger print information, iris information, and vein pattern information.

16. The software obtaining system according to claim 13, wherein the physical information stored in said physical information storing unit is at least one of, finger print information, iris information, vein pattern information, and voice pattern information.

17. The software obtaining system according to claim 13, wherein said order information management unit calculates an accumulated amount of utility fee of software based on said order information, and calculates at least either the discount rate or the discount amount of software, based on said calculated accumulated amount.

18. The software obtaining system according to claim 13, wherein said multifunction image forming apparatus further comprises a software obtaining control unit which reads data of said software from said storing unit, and carries out installing of said software.

19. The software obtaining system according to claim 18, wherein said software obtaining control unit stores the name of the software that is installed, to said order information storing unit, and determines whether, the software name input by said input operation unit is stored as a software name that is installed.

* * * * *